United States Patent [19]

Yada et al.

[11] 3,720,791

[45] March 13, 1973

[54] PULSE CODE MODULATION SYSTEM FOR HYBRID MULTIPLEX TRANSMISSION OF AUDIO AND DATA SIGNALS

[75] Inventors: Yutaka Yada, Tokyo; Tsukumo Higeta, Kawasaki-shi; Shinichi Mitsui, Yokohama-shi, all of Japan

[73] Assignee: Fujitsu Limited, Kawasaki, Japan

[22] Filed: March 29, 1968

[21] Appl. No.: 717,176

[30] Foreign Application Priority Data

March 31, 1967 Japan ................................42/20518

[52] U.S. Cl. ........179/15 BM, 179/2 DP, 179/15 BA

[51] Int. Cl. ................................................H04j 3/16

[58] Field of Search .179/15 A, 15 BA, 15 BY, 2 DP, 179/15 BS, 15 BW; 340/347; 325/38 A; 178/6 BW

[56] References Cited

UNITED STATES PATENTS

| | | | |
|---|---|---|---|
| 3,083,267 | 3/1963 | Weller | 179/15 BY |
| 2,963,551 | 12/1960 | Schreiber | 178/6 BW |
| 3,353,158 | 11/1967 | Davis | 179/15 BA |
| 3,470,325 | 9/1969 | Frohbach | 178/6 BW |

FOREIGN PATENTS OR APPLICATIONS

| | | | |
|---|---|---|---|
| 945,406 | 12/1963 | Great Britain | 179/15 BY |

*Primary Examiner*—Ralph D. Blakeslee

*Attorney*—Curt M. Avery, Arthur E. Wilfond, Herbert L. Lerner and Daniel J. Tick

[57] ABSTRACT

Clock signals divide asynchronous signals of two levels into equal time slots. The condition of the asynchronous signal is detected at a determined instant in a time slot so that it also determines a change in condition of the signal. The condition of the signal is indicated in a specific code indication depicting such condition and a change in condition of the signal is indicated in a different code indication depicting the instant of change of condition in a time slot. The code indications are transmitted mixed with PCM signals.

3 Claims, 11 Drawing Figures

PATENTED MAR 13 1973

3,720,791

SHEET 3 OF 8

PULSE CODE MODULATION SYSTEM FOR HYBRID MULTIPLEX TRANSMISSION OF AUDIO AND DATA SIGNALS

DESCRIPTION OF THE INVENTION

The present invention relates to a pulse code modulation system for hybrid multiplex transmission of audio and data signals. The pulse code modulation or PCM system functions as a digital communication system for data or information and converts or encodes digital information input signals such as, for example, baseband data signals or signal informations, formed by combining analog signals with digital signals, into a synchronous digital system. The analog signals may comprise audio or voice signals. The input signals are then converted to time division multiplex signals and are transmitted as such.

A PCM communication system encodes input signal informations and, if necessary, converts the codes into multiplex signals and transmits the multiplex signals to a synchronous digital transmission line. The system provides regenerative repeating transmission. Although quantization noises peculiar to such a system are generated in the coding or encoding process, deterioration such as, for example, additional noise or level variation, as in the regenerative repeating transmission of a conventional frequency division amplitude modulation system, does not occur in the PCM system. The resultant communication is therefore very stable.

In a conventional PCM transmission system for transmitting analog signal informations or data such as, for example, voice or audio signals, the input signal amplitude is sampled by a sampling pulse. The sampling pulse has a repetition frequency which is more than twice the maximum frequency of the input signal and is time division multiplexed or converted to a time division multiplex signal and then applied to an instantaneous compressor. The law of logarithmic companding $\mu = 100$ is ordinarily used as the law of compression. The compressed pulse amplitude modulation signals are converted into binary codes or general multinary codes of n components by a linear coder or encoder and are then converted into a pulse shape such as, for example, a bipolar pulse train suitable for transmission. The PAM signals are then transmitted. As aforedescribed, the PCM transmission system is thus primarily an inexpensive multiplex transmission system of high quality which transmits analog signals such as voice signals.

The regenerative repeating transmission line of the PCM communication system hereinbefore described is a synchronous digital transmission line. Even asynchronous digital signals or signal informations, such as, for example, baseband data signals, however, may also be transmitted with very high efficiency and high quality by proper conversion of such signal informations into synchronizing signals. It is also possible to transmit code pulses provided by coding the audio or voice signals and code pulses provided by synchronizing and converting the data as a hybrid. In such case, transmission of high flexibility and high efficiency may be realized by varying the hybrid ratio of data and audio signals in the hybrid transmission corresponding to the number of channels of data and voice signals or to the required speed.

The transmission system of the present invention utilizes a synchronous digital transmission line for transmitting digital signal informations such as data signals and a hybrid transmission system for transmitting data signals and encoded audio or voice signals. The transmission system of the present invention converts asynchronous serial data signals into synchronous digital codes and includes circuitry for multiplexing synchronous digital codes converted from data code pulses. The conversion may be accomplished by a code converter of fixed index type and the multiplexing may be accomplished by a multiplexing system in which a channel or a word forms a unit. The aforedescribed operations enable the transmission of input data signals by a simple arrangement and with the most efficient transmission characteristic and thereby provide a digital communication system for readily transmitting data and audio signals as a hybrid.

In a conventional PCM transmission system for transmitting digital signal informations such as baseband data signals, the amplitude of the input data signals is sampled at each of a plurality of equal time slots and the sampled output is transmitted without modification after it is converted to time division multiplex signals. Thus, for example, in a PCM telephone multiplex transmission system having 24 channels, the ringing signal of each channel is sampled at 8 kilocycles. The ringing signal is not modified further, and is transmitted via one bit in the time slot allotted to each voice channel. In such a system, data signals demodulated at the receiver are distorted to an extent equal to half the sampling period, so that the signal distortion may be ± 50 percent when the maximum speed of the data signals is equal to the sampling frequency. Accordingly, in order to provide a signal distortion of less than ±±5 percent, for example, it is necessary to provide the sampling at a frequency higher than ten times the maximum data speed. Consequently, the data may be transmitted at relatively low speed such as, for example, the transmission of ringing or telegraph signals at a halfband speed. It is, however, impossible to transmit data at broadband.

Heretofore, PCM transmission of broadband data such as, for example, asynchronous serial data signals or high speed facsimile signals, have been provided by sampling the amplitude of the input data at each of a plurality of equal time slots. The informations or signals indicating the change or variation, if any, of the state or condition of the input data signal or input data code such as, for example, a change from 0 to 1 or from 1 to 0, are converted into codes of three bits and the bits are selected in succession from the sampling instant or position at which the occurrence of the change was detected. The first bit indicates the occurrence of the change in the condition of the data signal or code, the second bit indicates whether the instant or position at which the change occurs is in the first or second half of the sampling period, and the third bit indicates the condition of the data signal or code after the change has occurred. The foregoing system is a code converting system which thus utilizes the principle of a sliding index. In such a system, sampling must be performed at a frequency higher than three times the maximum speed of the input data signals. Furthermore, it is necessary that codes be transmitted at a speed which is three times the speed of the input data. The maximum signal distortion may be limited to under ± 8.3 percent and the transmission efficiency may be improved to about three times the efficiency of the sampling system itself.

In the sliding index system, the transmission efficiency is very high. Only the instants or positions at which the condition of the codes of the input data is changed are encoded and transmitted, however, so that when the encoded signals are received and decoded, synchronism is necessary to determine which is the first, second or third bit. Accordingly errors in the pulse pattern and signal distortion in the decoded data at the receiver caused by pulse error of the PCM repeating transmission line have a tendency to increase. That is, if a single pulse is erroneously fed to a PCM channel or if a single pulse is erroneously removed from a PCM channel, the foregoing errors produce greater errors in reception and decoding. If a single pulse is erroneously fed to a PCM channel, for example, the pulse is detected as the first bit or the third bit and the succeeding correct code is also erroneously detected. For this reason, a single pulse error of a circuit produces an average data signal error of five bits in data transmitted at the maximum speed.

The principal object of the present invention is to provide a new and improved pulse code modulation system for hybrid multiplex transmission of audio and data signals.

An object of the present invention is to provide a pulse code modulation system for hybrid multiplex transmission of audio and data signals which overcomes the disadvantages and shortcomings of the systems of the prior art.

An object of the present invention is to provide a pulse code modulation system for hybrid multiplex transmission of audio and data signals in which pulse error in the converter is less liable to occur than in the converter of a sliding index system, and in which data codes are converted into synchronizing PCM codes having such stable transmission characteristics that no synchronization in each channel is required in reception and decoding.

An object of the present invention is to provide a pulse code modulation system for hybrid multiplex transmission of audio and data signals, or to provide a hybrid multiplex transmission system in which data and audio signals may be transmitted as a hybrid, with considerable facility and flexibility.

Another object of the present invention is to provide a pulse code modulation system for hybrid multiplex transmission of audio and data signals which functions with efficiency, reliability and effectiveness.

In accordance with the present invention, in a PCM system, input data signals are converted into synchronizing PCM codes by dividing data signals having two levels asynchronous to the PCM system into equal time slots. The information indicating the condition of the codes of the data signals within the time slots and the information indicating the instant in which the condition of the codes changes within the time slots is converted into synchronizing codes of n bits. The n bits of synchronizing codes converted from PCM code trains of input data are then converted to time division multiplex signals and are transmitted in idle channel time slots of the PCM code train.

The system of the present invention converts broadband data such as, for example, asynchronous serial data or high speed facsimile signals, into synchronizing PCM codes by a code converter of fixed index type. In the code converter, input data signals are divided into equal time slots and the information indicating the condition of the input data in the time slot and the information indicating the instant of change of condition of the input data in the time slot are converted into a three bit code.

In accordance with the present invention, a digital communication system for converting and transmitting asynchronous signals of two levels by synchronous digital transmission comprises clocks for dividing asynchronous signals of two levels into equal time slots. A detector detects the condition of the asynchronous signal at a determined instant in a time slot thereby also determining a change in condition of the signal. An encoder connected to the detector indicates the condition of the signal in a specific code indication depicting the condition and indicates a change in condition of the signal in a different code indication depicting the instant of change of condition in a time slot. A transmitter connected to the encoder transmits the code indications.

The code indications are mixed with PCM signals and the mixed signals are transmitted. The encoder comprises a converter for converting the asynchronous signals in equal time slots into synchronizing pulses of n bits and further clocks subdivide the time slots into $2^n - 2$ subdivisions each, the code indication depicting the instant of change of condition being placed in the subdivisions.

In accordance with the present invention, a pulse code modulation system for hybrid multiplex transmission of audio and data signals includes clocks for dividing asynchronous data signals of two levels into equal time slots. A detector detects the condition of the asynchronous signal at a determined instant in a time slot, thereby also determining a change in condition of the signal. An encoder connected to the detector indicates the condition of the signal in a specific code indication depicting the condition and indicates a change in condition of the signal in a different code indication, depicting the instant of change of condition in a time slot. A multiplexer connected to the encoder time division multiplexes the code indications. A transmitter connected to the multiplexer transmits the time division multiplexed signals.

In accordance with the present invention, a method of hybrid multiplex transmission of audio and data signals comprises the steps of dividing asynchronous data signals of two levels into equal time slots. The condition of the asynchronous signal is detected at a determined instant in a time slot thereby also determining a change in condition of the signal. The condition of the signal is indicated in a specific code indication depicting the condition and a change in condition of the signal is indicated in a different code indication depicting the instant of change of condition in a time slot. The code indications are time division multiplexed. The time division multiplexed signals are transmitted.

PCM signals are provided and the code indications are mixed with the PCM signals and the mixed signals are transmitted. The asynchronous signals in equal time slots are converted into synchronizing pulses of n bits and the time slots are subdivided into $2^n - 2$ subdivisions each. The code indication depicting the instant of change of condition is placed in the subdivisions.

In order that the present invention may be readily carried into effect, it will now be described with reference to the accompanying drawings, wherein.

Figure 3A:
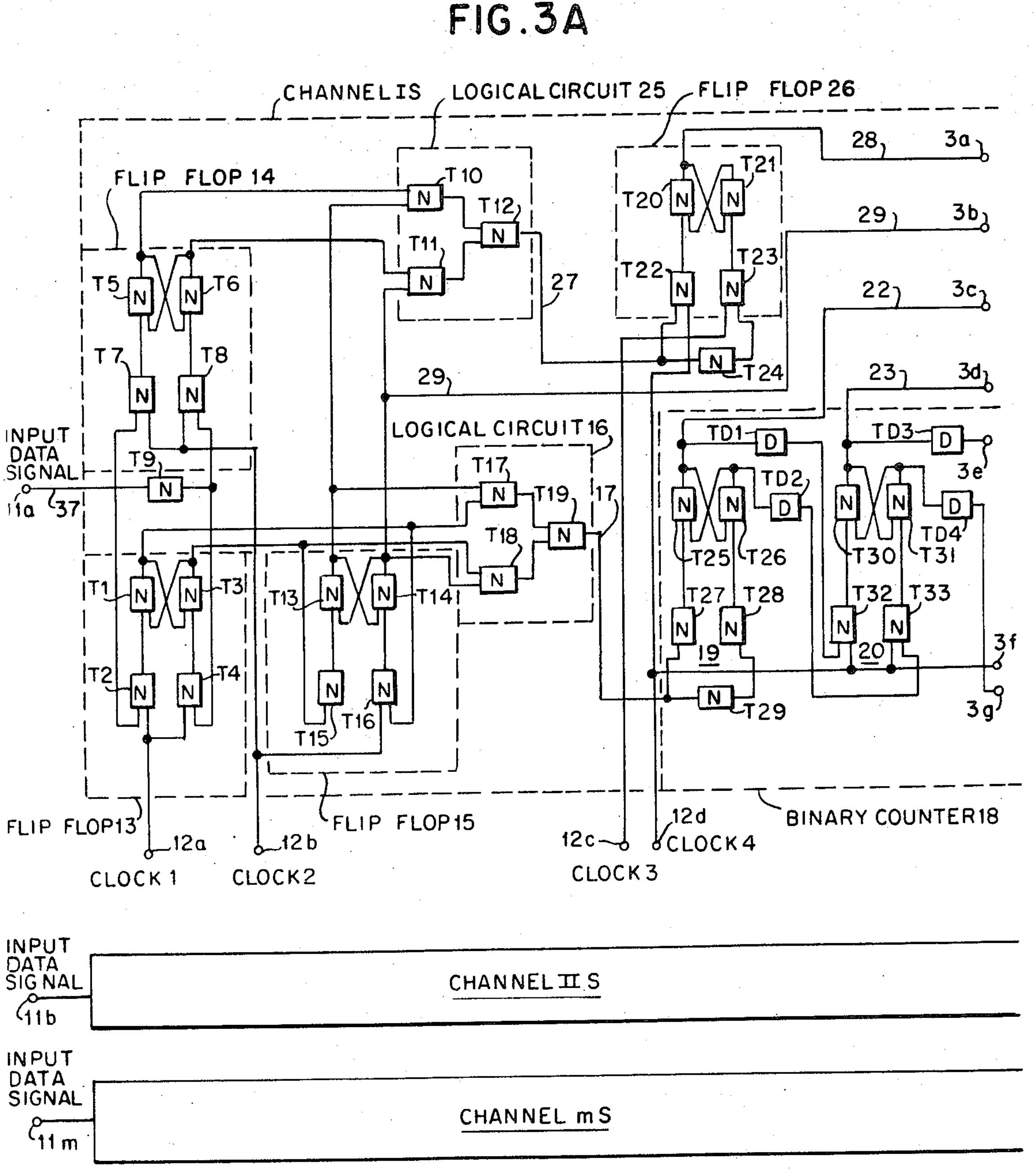
Figure 3B:
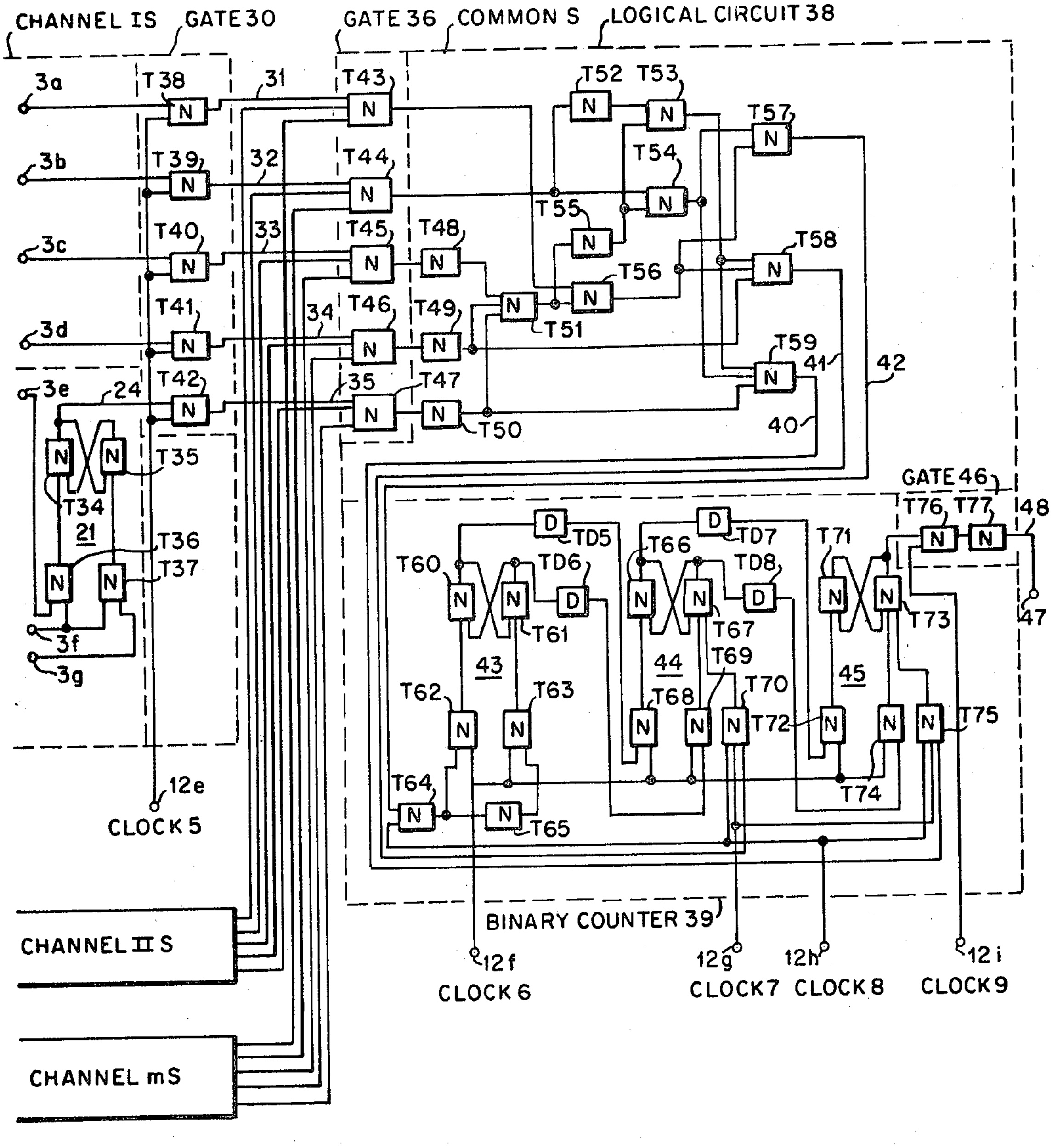
Figure 4A:
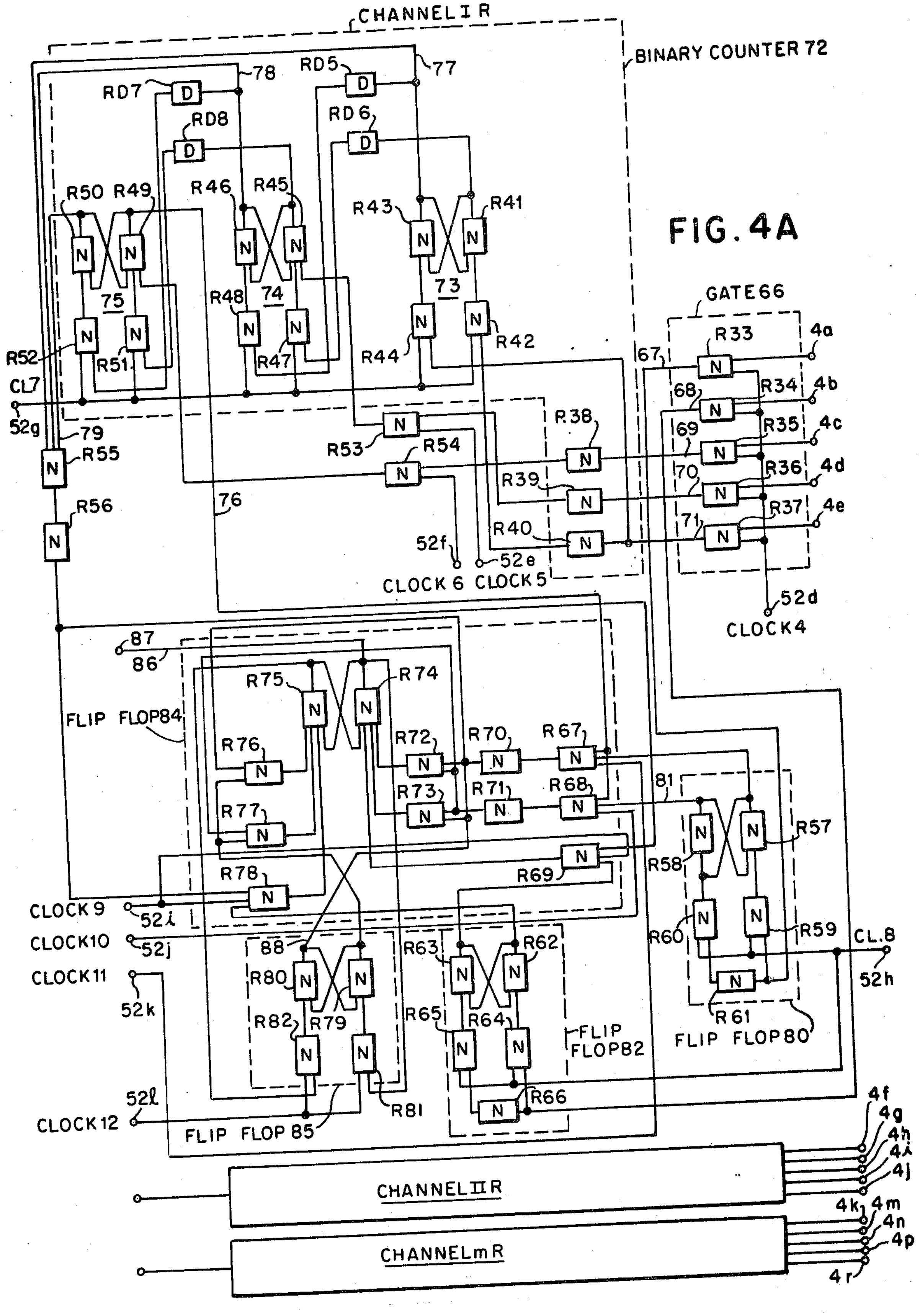
Figure 4B:
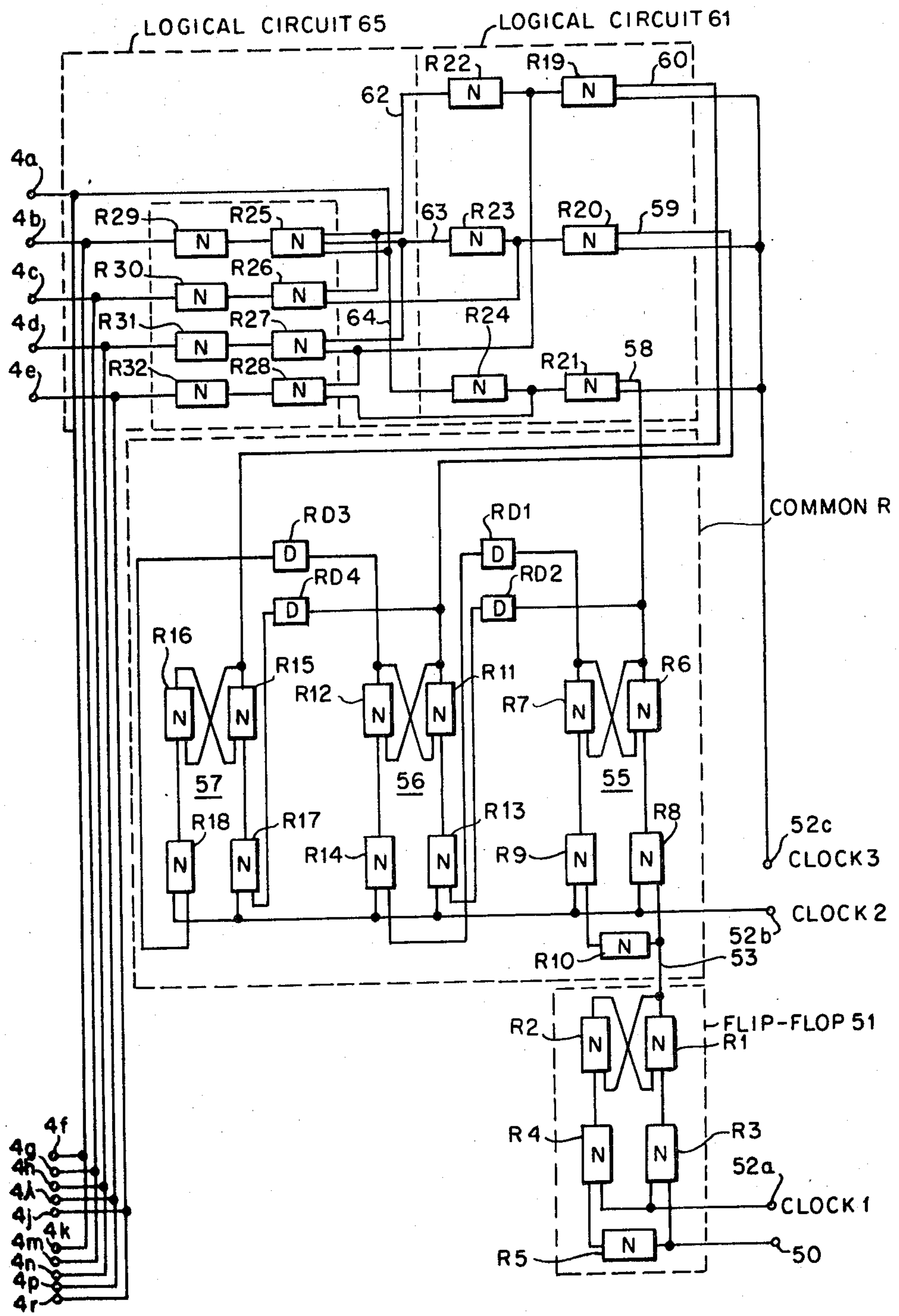
Figure 5:
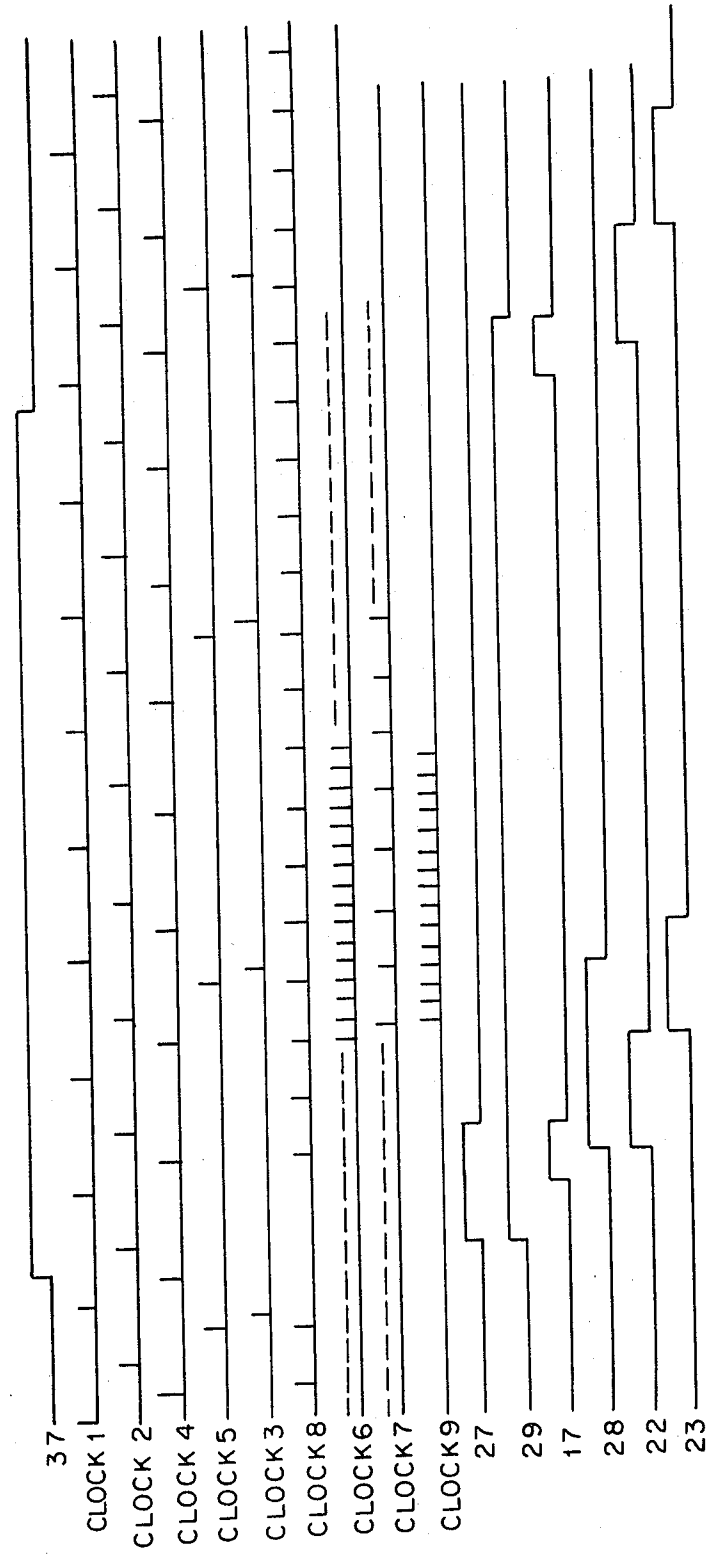
Figure 6:
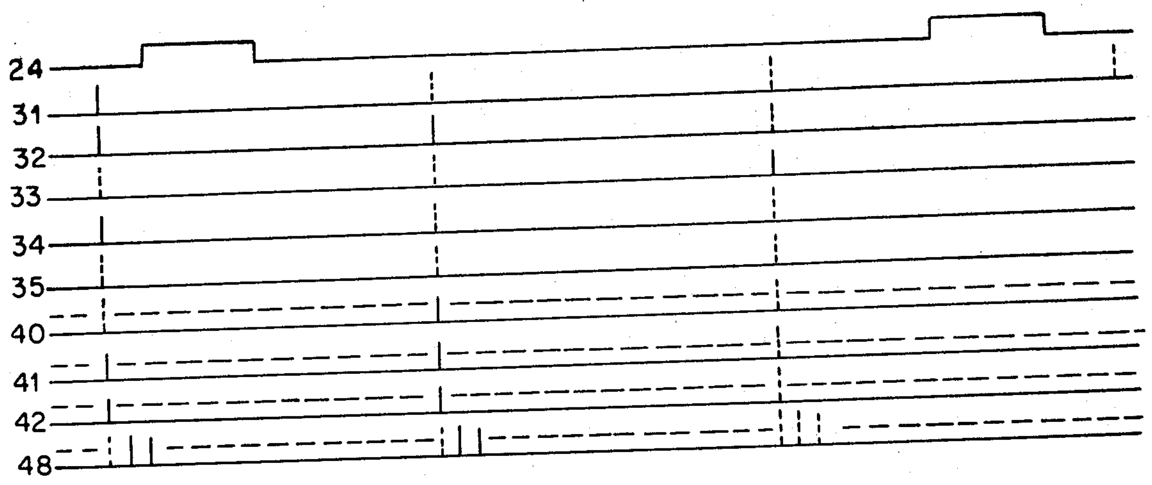
Figure 7:
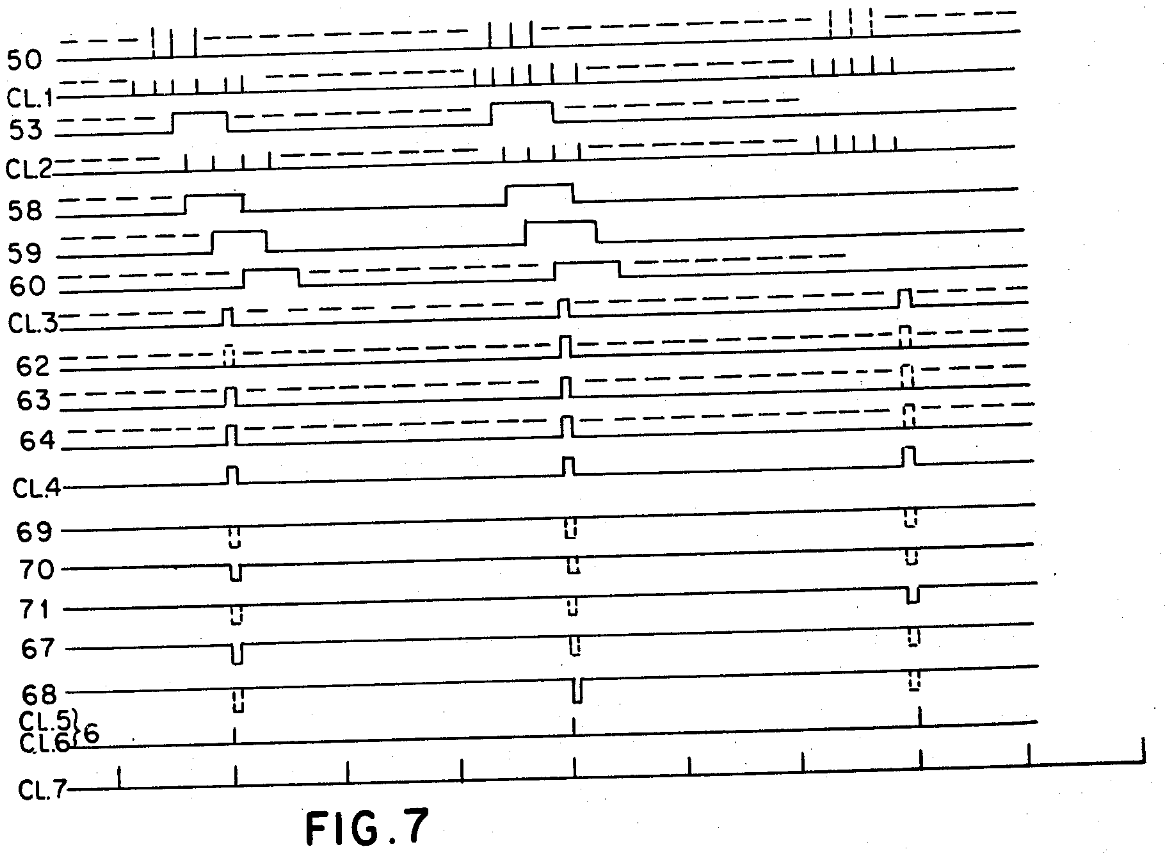
Figure 8:
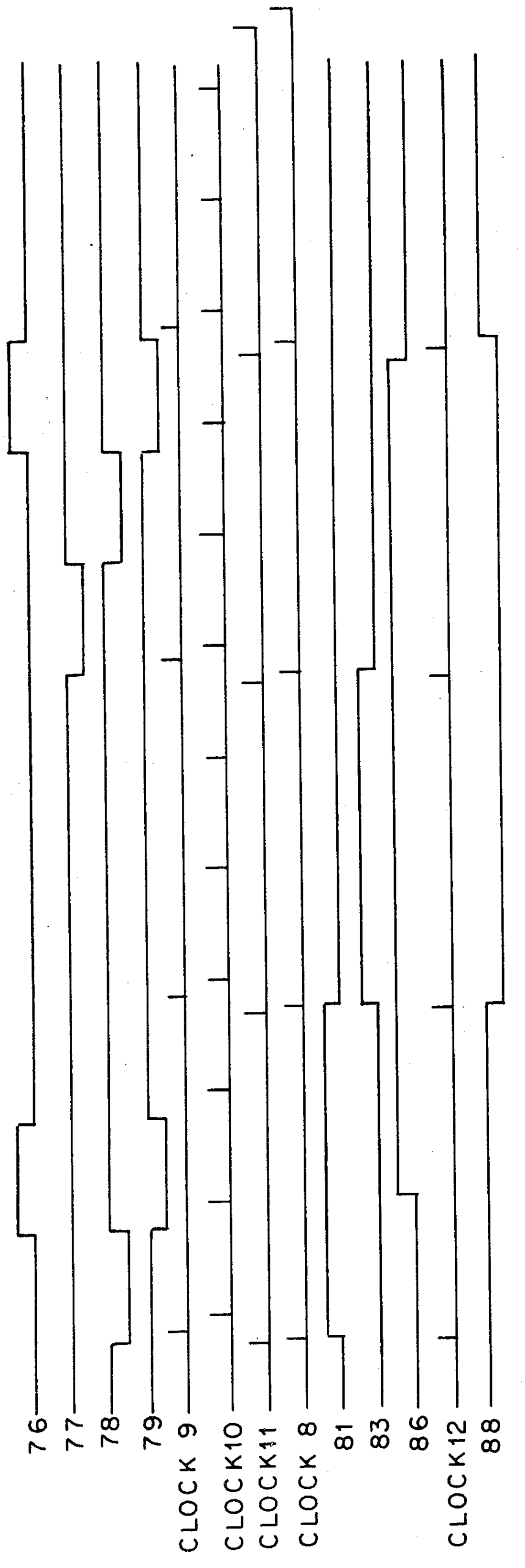
Figure 9:
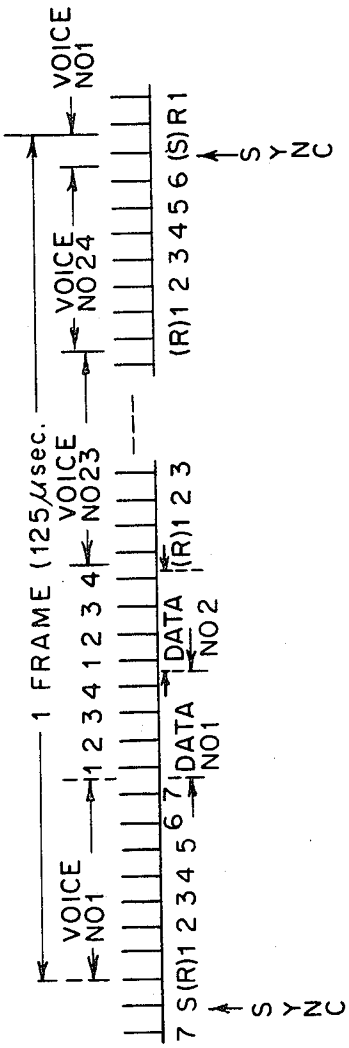

FIGS. 3A and 3B, which together indicate a single circuit, are a circuit diagram of an embodiment of a transmitter of the pulse code modulation system of the present invention for hybrid multiplex transmission of audio and data signals;

FIGS. 4A and 4B, which together indicate a single circuit, are a circuit diagram of an embodiment of a receiver of the pulse code modulation system of the present invention for hybrid multiplex transmission of audio and data signals;

FIGS. 5 and 6 are graphical presentations illustrating the operation of the transmitter of FIGS. 3A, 3B;

FIGS. 7 and 8 are graphical presentations illustrating the operation of the receiver of FIGS. 4A, 4B; and FIG. 9 is a graphical presentation of the frame of the pulse code modulation system of the present invention for hybrid multiplex transmission of audio and data signals.

Figure 1:
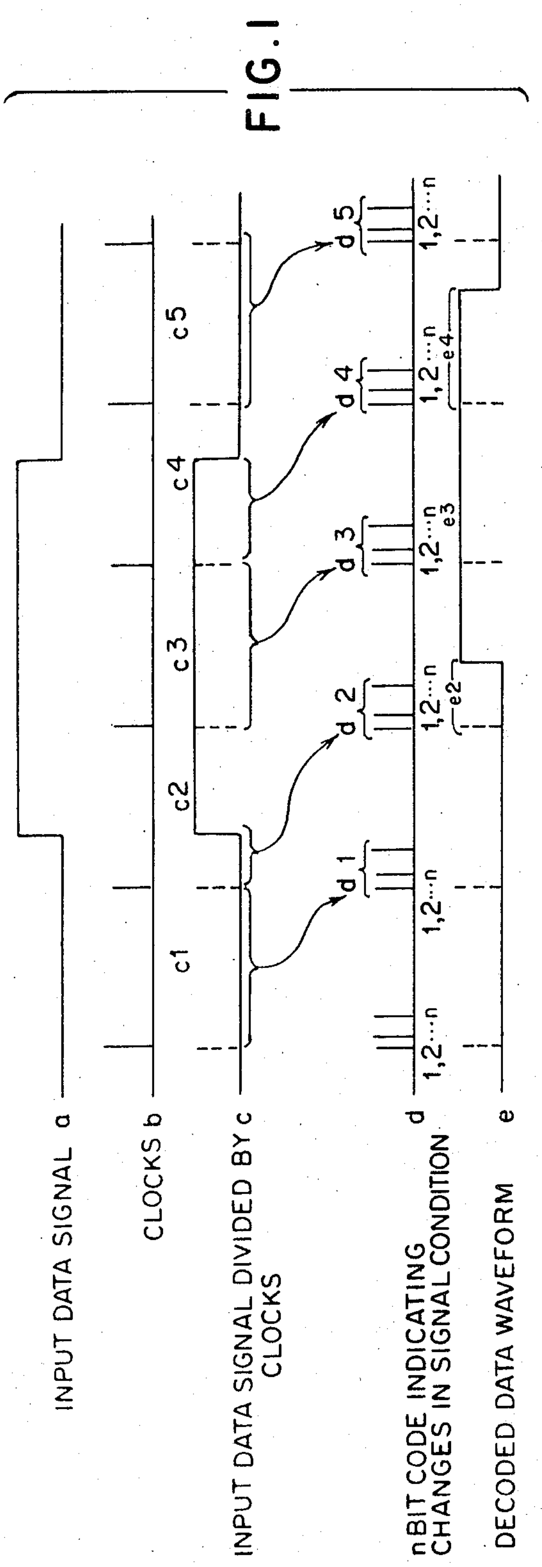
FIG. 1 is a graphical presentation illustrating the principle of operation of the pulse code modulation system of the present invention for hybrid multiplex transmission of audio and data signals.

In asynchronous serial data signals or the like having two levels, the change between the two levels, which is the change between the 0 signal and the 1 signal or between the 1 signal and the 0 signal, generally occurs at random. The informations which must be transmitted indicate the instant of occurrence of the change between the two signal levels and the condition of the signals before and after the instant of change. In the system of the present invention, the instant of change in condition of the signal and the condition of the signal before and after such change are converted into codes of *n* bits and such codes are transmitted. In FIG. 1, the input data signal waveform is indicated as curve *a*. Curve *b* of FIG. 1 shows the dividing clocks or clock signals for dividing the input data waveform into equal time slots. The input data waveform of curve *a* divided by the dividing clocks of curve *b* into equal time slots is shown in curve *c*.

In curve *c*, the input data signal is in its 0 condition in the time slots *c*1 and *c*5 and is in its 1 condition in the time slot *c*3. The input data signal changes from its 0 condition to its 1 condition in the time slot *c*2 and from its 1 condition to its 0 condition in the time slot *c*4. Curve *d* of FIG. 1 illustrates an *n* bit code which indicates the condition of the input data signal code before and after a change therein and the instant of each change in such condition. Curve *d* is transmitted in equal time slots. The code pulses *d*1, *d*2, *d*3, *d*4, and *d*5 of curve *d* are converted from the signal conditions *c*1, *c*2, *c*3, *c*4 and *c*5, respectively, of the input data signal of curve *c*.

When data signals are converted into a code of *n* bits, $2^n$ code or signal conditions may be indicated. Two sets of the $2^n$ conditions are utilized to indicate the code condition 0 and the code condition 1 of the data signals when there is no change in the condition of the data signal. The remaining sets of the $2^n$ conditions, which constitute $2^n - 2$ conditions, are utilized to indicate the position or instant at which the condition changes in each time slot. In other words, the instants of change in the time slots are quantized into $2^n - 2$ conditions and are coded or encoded and transmitted.

The maximum bit speed of the input data may be increased to the frequency of the dividing clocks. At such speed, the signal distortion of the received signals is a maximum. In the code converter of the system of the present invention, the maximum signal distortion is $\frac{1}{2}(2^n - 2)$. The relation between the number of bits, the signal distortion and the transmission speed is illustrated in Table I. As shown in Table I, when the number of bits is increased, the maximum data speed decreases in proportion to $1/n$ and the signal distortion decreases sharply. Since the permissible distortion in broadband data transmission is presently ± 10 to 15 percent, three or four bits may be considered to be a suitable practical number of bits.

TABLE I

| Number of bits | 1 | 2 | 3 | 4 | 5 |
|---|---|---|---|---|---|
| Maximum signal distortion | ±50% | ±25% | ±8.3% | ±3.3% | ±1.6% |
| Data speed of transmitted codes | 1 | ½ | ⅓ | ¼ | 1/5 |

In FIG. 1, curve *e* shows the received waveform after it has been decoded. Curve *e* of FIG. 1 thus discloses the decoded data. The signals *e*2 and *e*4 correspond to the instants *d*2 and *d*4, respectively, of change of condition of the data signal. At such time, the direction of change of the condition of the data signal is indicated by the signals *d*1 and *d*3, which indicate the condition of the data signal prior to each change. Although it may seem that the signal *d*5, which indicates the condition of the data signal after the change therein indicated by the signal *d*4, does not contribute to the decoding, said signal *d*5 actually functions to prevent continuous error in decoded data which may be caused by signal error in the aforedescribed channel. If it is assumed that a pulse error occurs in a circuit at a specific instant and a pulse code train which indicates the condition of the data signal is erroneously changed into a pulse code train which indicates the instant of change of the condition of the data signal, or vice versa, such error may be corrected by a code indication of the condition of the data signal after the erroneous signal, that is, the condition of the next succeeding time slot. This prevents the data error from exceeding one bit.

As hereinbefore described, in the converter of the system of the present invention for converting data signals into a synchronous digital system, there is a continuous transmission of indications of the instants at which the condition of the input data signal or of the code representing the input data signal changes and of indications of the condition of such signals or codes. Thus, when a pulse error occurring in a circuit is an error of a single bit or an error of less than *n* continuous bits, such pulse error does not exceed two bits in the decoded data signal, so that any errors which occur in the converter are scarce. Furthermore, in the code converter of the system of the present invention, pulse trains which indicate the condition of the data signal in each time slot or which indicate the instant of change in the data signal are converted into *n* bit codes and are transmitted at a specific determined instant in each time slot. Thus, such synchronism as is required in the sliding index system of the prior art is not required in receiving and decoding the transmitted signals in the system of the present invention. The time division multiplexing by the unit of channels or words comprising *n* code pulse trains as the reference is also readily realized, so that the system of the present invention is especially suitable for the hybrid transmission of data or audio signals or voice, as hereinafter described.

Figure 2:
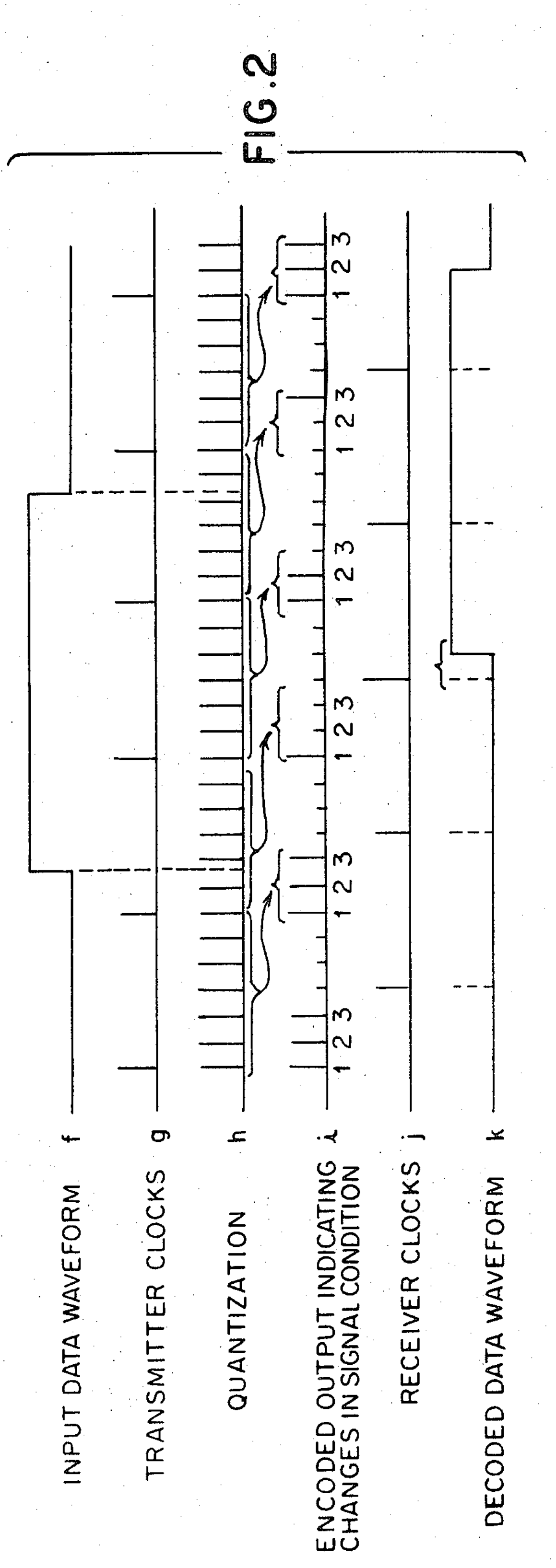
FIG. 2 is a graphical presentation illustrating the operation of a three bit code pulse code modulation system of the present invention for hybrid multiplex transmission of audio and data signals.

FIG. 2 is a time diagram of signals illustrating the operation of the system of the present invention with a three bit code. The embodiment of the system of the present invention utilizing a three bit code is shown in FIGS. 3A and 3B. In FIG. 2, curve *f* shows the input data waveform. Curve *g* of FIG. 2 shows the clocks or time slots into which the input data waveform or signal is divided by the dividing clocks. Curve *h* of FIG. 2 discloses the quantization for determining the instant or position at which the condition of the input data signal or code changes in each time slot. The number of subdivisions of each time slot is $2^n - 2$, so that if a three bit code is utilized, the number of subdivisions is $2^3 - 2$, or b6.

In FIG. 2, curve *i* shows the encoded output. In curve *i*, of the combinations of three bits codes, 111 and 110 are utilized to indicate the condition of the input data signal when such condition is not changed. The remaining combinations are utilized to indicate the position or instant of the change of condition of the input data signal in each time slot. Thus, a change of condition of the input data signal from 0 to 1 occurs in the second subdivision or quantization step in the second time slot. A change of condition of the input data signal from 1 to 0 occurs in the fifth subdivision or quantization step of the fourth time slot. The change of condition from 0 to 1 is indicated by the code representation or indication 100 and the change in condition from 1 to 0 is indicated by the code representation or indication 001.

Curve *j* of FIG. 2 indicates the reference time slots for receiving and decoding the transmitted signals received at the receiver, which time slots correspond to the time slots or clocks of the transmitter. The received code pulse trains are decoded by utilizing the time slots or receiver clocks of curve *j* as a reference and are changed into decoded data waveforms illustrated by curve *k* of FIG. 2. Each time slot in curve *i* includes three idle or non-utilized subdivisions or quantization steps. The coding or encoding pulses of the other data channel converted by the same process as indicated by the curves *f*, *g*, *h*, and *i* may be individually multiplexed by the utilization of such idle subdivisions. Similarly, additional data signals may be multiplexed and transmitted by further subdivision of each of the three non-utilized subdivisions.

FIGS. 3A and 3B illustrate an embodiment of a transmitter of the system of the present invention and FIGS. 4A and 4B illustrate an embodiment of a receiver of the system of the present invention. FIGS. 5 and 6 illustrate the waveforms appearing in the transmitter of FIGS. 3A and 3B, and FIGS. 7 and 8 illustrate the waveforms appearing in the receiver of FIGS. 4A and 4B. In FIGS. 5, 6, 7 and 8, the relation between phases is shown and the pulse width is not indicated. The zero clock conditions are indicated in these FIGS. by broken line pulses. In each of FIGS. 3A, 3B and 4A, 4B, the symbol identified by an N is a NAND gate and the symbol identified by a D is a delay line. Each of the NAND gates of the transmitter (FIGS. 3A, 3B) is identified by a reference numeral preceded by a T and each of the NAND gates of the receiver (FIGS. 4A, 4B) is identified by a reference numeral preceded by an R.

A NAND circuit functions in a manner whereby all the inputs must be at logical 1 before it becomes conductive and transfers a signal from its input to its output. A NAND circuit or gate is well known, so that any suitable NAND circuit or gate may be utilized for each of those included in the embodiments of FIGS. 3A, 3B and 4A, 4B. A NAND gate which is an integrated circuit is preferably utilized.

A suitable NAND circuit is shown and described on pages 101 and 102 of "Computer Basics" Vol. 6, "-Solid-State Computer Circuits," by Technical Education and Management, Inc., First Edition, 1962, Howard W. Sams & Co., Inc., The Bobbs-Merrill Company, Inc. of Indianapolis and New York. Each delay line may comprise any suitable delay line known in the art.

In order to illustrate the system of the present invention, it is assumed that a three bit code is utilized. Thus, the condition of the input data signal or a change of condition of the data signal is indicated by a three bit code. When the condition of the input data signal is changed, the time slot in which the change occurs is subdivided into six subdivisions, as hereinbefore mentioned. Furthermore, although there are *m* multiplex channels, the channels are not shown in the FIGS., since they are the same as the first channel, which is shown.

FIGS. 3A and 3B comprise the channel part IS of the first channel and the common part S. Input terminals 11*a*, 11*b*, . . . 11*m* supply two level input data signals to the transmitter. Clocks 1 to 9 are supplied via terminals 12*a* to 12*i*, respectively. The input terminal for the channel part IS is thus 11*a*, that for the channel part IIS is 11*b* and that for the channel part mS is 11m.

Data signals supplied via the input terminal 11*a* are controlled by clocks 1 and 2 which are supplied via the input terminals 12*a* and 12*b*. The input data signals are stored in a flip flop 13 comprising NAND gates T1, T2, T3 and T4. The input data signals are also stored in a flip flop 14 comprising NAND gates T5, T6, T7 and T8 and a flip flop 15 comprising NAND gates T13, T14, T15 and T16. The output of the NAND gate T14 indicates the waveform of the input data signal. Clocks 1, 2 and 4 are clocks or time pulses in a single time slot.

In order to determine the position or instant of a change of condition of the input data signal, it is first necessary to determine at which of the three clocks in the single time slot the change occurs. This first determination is called the rough indication of the position or instant of change of the input data signal and is determined by a logical circuit 16 which comprises NAND gates T17, T18 and T19. The logical circuit 16 has inputs connected to the flip flops 13 and 15. The output of the logical circuit 16 is connected via an output lead 17 to an input of a binary counter circuit 18.

The output in the lead 17 from the logical circuit 16 is controlled by clock 4 supplied to the input terminal 12d.

The binary counter 18 comprises three flip flop stages 19, 20 and 21. The flip flop 19, or first counter stage, comprises NAND gates T25, T26, T27 and T28. The second counter stage, or flip flop 20, comprises NAND gates T30, T31, T32 and T33. The third counter stage, or flip flop 21, comprises NAND gates T34, T35, T36 and T37. The counter 18 has three outputs connected to leads 22, 23 and 24, respectively, the lead 22 being connected to the output of the first counter stage, the lead 23 being connected to the output of the second counter stage and the lead 24 being connected to the output of the third counter stage. The counter 18 also includes four delay lines TD1, TD2, TD3 and TD4.

The determination of whether a change in condition of the input data signal is in the first half of the clock, or time slot formed by the clock, or in the second half of such clock is made by a logical circuit 25 comprising NAND gates T10, T11 and T12. The inputs of the logical circuit 25 are connected to the flip flops 14 and 15 and the output of said logical circuit is connected to a flip flop 26 via a lead 27. The flip flop 26 comprises NAND gates T20, T21, T22 and T23. The output of the logical circuit 25, which indicates the position or instant of the change of condition of the input data signal, is stored in the flip flop 26. The output of flip flop 26 is connected to a lead 28. The flip flop 26 is reset by the clock 3 supplied to the input terminal 12*c*.

The output of the flip flop 14 is connected to a lead 29 and the leads 22, 23, 24, 28 and 29 transmit signals which are simultaneously read out in parallel at an instant allotted to the first channel by a gate circuit 30. The waveform of the input data signal in the lead 29 is shown in curve 29 of FIG. 5. The gate 30 comprises NAND gates T38, T39, T40, T41 and T42 and is controlled by a time division multiplexing clock which is the clock 5 supplied via the input terminal 12*e*. The signals transferred by the gate 30 are transmitted to the inputs of the common part S corresponding to the first channel IS, via leads 31, 32, 33, 34 and 35 from the outputs of the NAND gates T38, T39, T40, T41 and T42, respectively.

The outputs of all of the channels are supplied to the common part S via a gate circuit 36. Thus the leads 31 to 35 and the output leads from the channels IIS and mS, as well as the other channels (not shown in the FIGS.), are connected to the inputs of the gate circuit 36. The gate circuit 36 comprises NAND gates T43, T44, T45, T46 and T47. The gate 36 time division multiplexes the signals supplied thereto. The curves of FIGS. 4 and 6 illustrate the waveforms appearing in FIGS. 3A, 3B and are labelled with the same reference numerals as the leads of FIGS. 3A, 3B in which they appear. Thus, the waveform of the input data signal supplied to the flip flops 13 and 14 via the input terminal 11a, a lead 37 and NAND gate T9 is shown in curve 37 of FIG. 5. Curves 27, 29, 17, 28, 22 and 23 of FIG. 5 show the waveforms appearing in the leads 27, 29, 17, 28, 22 and 23 of FIGS. 3A, 3B. Curves 24, 31, 32, 33, 34 and 35 of FIG. 6 illustrate the waveforms appearing in the leads 24, 31, 32, 33, 34 and 35, respectively of FIGS. 3A, 3B.

The outputs of the gate 36, which are the waveforms 31 to 35 of FIG. 6 appearing in the leads 31 to 35, respectively, are supplied to the inputs of a logical circuit 38. The logical circuit 38 comprises NAND gates T48 to T59 and functions to convert the signals 31, 33, 34 and 35, which indicate the instant of the change of condition of the input data signal, into parallel code indications of 3 bits. The logical circuit 38 also functions to convert the signal 32, which indicates the condition of the input data signal, into a corresponding 3 bit code indication, of 111 or 110, as hereinbefore mentioned. The encoded signals of the three-bit code are added or D/D converted.

The outputs of the logical circuit 38 are connected to the inputs of a binary counter 39 via leads 40, 41 and 42. The waveforms of the signals in the leads 40, 41 and 42 are shown in curves 40, 41 and 42 of FIG. 6. The output signals of the logical circuit 38 are parallel codes and are converted by the binary counter 39 into serial codes by 3 bit units. The binary counter 39 comprises 3 stages. The first stage of the binary counter 39 is a flip flop 43 comprising NAND gates T60, T61, T62 and T63. The second stage of the binary counter 39 is a flip flop 44 which comprises NAND gates T66, T67, T68 and T69. The third stage of the counter 39 comprises a flip flop 45 which comprises NAND gates T71, T72, T73 and T74. The counter 39 also includes NAND gates T64, T65, T70 and T75, connected to control the various flip flops thereof, and delay lines TD5, TD6, TD7 and TD8.

The clocks 6, 7 and 8, supplied via the input terminals 12*f*, 12*g* and 12*h*, respectively, control the operation of the three stages of the binary counter 39. Clock 6 controls the operation of the counter 39, whereas the clocks 7 and 8 provide timing control. The clock 9, supplied via the input terminal 12*i*, controls a gate 46, comprising NAND gates T76 and T77, to change the output signals of the counter 39, which are supplied as the input to the gate 46, to a unipolar pulse train which is supplied to an output terminal 47 via a lead 48. The unipolar pulse train, provided at the output terminal 47 via the lead 48, is shown in curve 48 of FIG. 6. Synchronizing signals, or other necessary or desirable signals, are supplied to the output terminal 47 and may be converted into a bipolar pulse train and transmitter.

FIGS. 4A, 4B comprise a common part R and a first channel part IR. Of *m* channels, only the first channel IR is shown. Channels IIR and *m*R are indicated in block form. Signals received from the transmitter are converted at the receiver into a unipolar pulse train by an operation which is the reverse of that performed in said transmitter. The unipolar pulse train is then supplied to the common part R via an input terminal 50. The signal supplied to the input terminal 50 is thus the same as the signal in the lead 48 of FIG. 3B, and is shown in curve 48 of FIG. 6 and curve 50 of FIG. 7. The received signals are supplied to a flip flop 51 via the input terminal 50. The flip flop 51 comprises NAND gates R1, R2, R3 and R4. Clock 1 is supplied to the flip flop 51 via an input terminal 52a and controls said flip flop to convert the input signal supplied via the input terminal 50 into an NRZ pulse train shown in curve 53 of FIG. 7 and supplied via a lead 53 from the output of said flip flop to the input of a binary counter 54.

The binary counter 54 comprises three stages. The first stage of the counter 54 comprises a flip flop 55, the second stage comprises a flip flop 56 and the third stage comprises a flip flop 57. The flip flop 55, or first stage of the counter, comprises NAND gates R6, R7, R8 and R9. The flip flop 56, or second stage of the counter, comprises NAND gates R11, R12, R13 and R14. The flip flow 57, or third stage of the counter, comprises NAND gates R15, R16, R17 and R18. The binary counter 54 also includes delay lines RD1, RD2, RD3 and RD4 and a NAND gate R10.

Clock 2 is supplied to the binary counter 54 via an input terminal 52*b* and converts the serial output signals from the flip flop 51 into parallel signals which are provided at the outputs of said binary counter. The outputs of the binary counter 54 are connected to leads 58, 59 and 60. The signals in the leads 58, 59 and 60 have the waveforms shown in curves 58, 59 and 60 of FIG. 7 and are supplied to the inputs of a logical circuit 61.

The logical circuit 61 comprises NAND gates R19, R20, R21, R22, R23 and R24. The logical circuit 61 functions to convert the signals received from the binary counter 54 into the waveforms shown in curves 62, 63 and 64 of FIG. 7. The waveforms of curves 62, 63 and 64, provided at the outputs of the logical circuit 61, are supplied via the leads 62, 63 and 64 to the inputs of a logical circuit 65. The operation of the logical circuit 61 as a converter is controlled by clock 3 which is supplied via an input terminal 52*c*.

The logical circuit 65 comprises NAND gates R25, R26, R27, R28, R29, R30, R31 and R32. The logical circuit 65 functions to convert the signals supplied from the logical circuit 61 into five-bit informations, thereby D/D converting said signals. The signals provided by the logical circuit 65 are multiplexed and are transferred to the first channel IR of the channel part and to the other channels of the channel part, of which only the second channel IIR and *m*th channel *m*R are indicated.

The output signals from the logical circuit 65 are supplied to a gate 66 which is controlled by clock 4 supplied to said gate via an input terminal 52d. The gate 66 comprises NAND gates R33, R34, R35, R36 and R37. The outputs of the NAND gates R33 to R37 are connected to leads 67, 68, 69, 70 and 71, respectively. Curves 67, 68, 69, 70 and 71 of FIG. 7 show the waveforms of the signals in the leads 67, 68, 69, 70 and 71, respectively.

The signals in the lead 67 indicate the change of condition of the data signal in fine form. The signals in the lead 68 indicate the condition of the data signals. The signals in the leads 69, 70 and 71 indicate the change of condition of the data signals in rough form. The signals in the lead 69, 70 and 71 are supplied to the inputs of a binary counter 72.

The binary counter 72 has three stages. Each stage of the binary counter comprises a flip flop. A flip flop 73, or first stage of the counter, comprises NAND gates R41, R42, R43 and R44. A flip flop 74, or second stage of the counter, comprises NAND gates R45, R46, R47 and R48. A flip flop 75, or third stage of the counter, comprises NAND gates R49, R50, R51 and R52. The binary counter 72 also includes delay lines RD5, RD6, RD7 and RD8.

Clocks 5, 6 and 7, supplied to the binary counter 72 via input terminals 52*e*, 52*f* and 52*g*, read in the signals in the leads 69, 70 and 71, which indicate the change of condition of the input data signal in rough form. The binary counter 72 also includes NAND gates R38, R39, R40, R53 and R54, which are utilized for control purposes. An output of the counter 72, which provides a signal which indicates the instant or position of change of condition of the input data signal, is connected to a lead 76. In FIG. 8, curve 76 shows the waveform of the signal in the lead 76.

The output of the first stage of the binary counter 72 is connected to a lead 77. The output of the second stage of the counter 72 is connected to a lead 78. The output of the third stage of the counter 72 is connected to a lead 79. The waveforms of the signals in the leads 77, 78 and 79 are shown in curves 77, 78 and 79 of FIG. 8. The leads 77, 78 and 79 are connected to the inputs of a NAND gate R55. The output of the NAND gate R55 is connected to the input of a NAND gate R56. The NAND gate R56 produces signals which indicate that all the outputs of the counter 72, in the leads 77, 78 and 79, are zero, so that such signals indicate that no change of the condition of the input data signal has occurred.

The lead 67 is connected to the input of a flip flop 80. The flip flop 80 comprises NAND gates R57, R58, R59, and R60. A NAND gate R61 is utilized for control purposes. The flip flop 80 is controlled by clock 8 which is supplied thereto via an input terminal 52*h*. The flip flop 80 functions to store the signals in the lead 67, which signals indicate the instant or position, in fine form, of a change of condition of the input data signal. The output of the flip flop 80 is connected to a lead 81.

The lead 68 is connected to the input of a flip flop 82. The flip flop 82 comprises NAND gates R62, R63, R64 and R65. A NAND gate R66 is utilized for control purposes. The flip flop 82 is controlled by clock 8 which is supplied thereto via the input terminal 52h. The flip flop 82 functions to store the signals in the lead 68, which signals indicate the condition of the input data signal. The output of the flip flop 82 is connected to a lead 83. The waveforms of the signals in the leads 81 and 83 from the flip flops 80 and 82, respectively, are indicated in curves 81 and 83 of FIG. 8.

The leads 81 and 83 supply the output signals of the flip flops 80 and 82 to inputs of flip flop 84. The flip flop 84 comprises NAND gates R67 to R78. Other inputs of the flip flop 84 are connected to the outputs of a flip flop 85. The flip flop 85 comprises NAND gates R79, R80, R81 and R82. The flip flop 84 is controlled by the signals in the lead 76, which is connected to an input of said flip flop and which indicate, in rough form, the instant or position of a change of condition of the input data signal. The flip flop 84 is also controlled by the signals in the lead 81, which indicate, in fine form, the instant or position of a change of condition of the input data signal and by the signals in the lead 83, which indicate the condition of the input data signals. The flip flop 84 is also controlled by the signals provided at the output of the NAND gate R56, which signals indicate that no change of condition of the input data signals has occured, and by clocks 9, 10 and 11, supplied via input terminals 52*i*, 52*j*, 52*k*, respectively. The decoded data waveforms, as shown in curve 86 of FIG. 8, are provided in a lead 86. The lead 86 is connected to the output of the flip flop 84. An output terminal 87 is connected to the lead 86.

The flip flop 85 is controlled by clock 12, supplied via an input terminal **52*l*. The flip flop 85 stores the signals provided in the lead 86 by the flip flop 84. The output of the flip flop 85 is provided in a lead 88 and has a waveform, as shown in curve 88 of FIG. 8. The output of the flip flop 85 is supplied to the flip flop 84. The signals in the lead 88 determine the direction of the change of condition of the input data signals at the time that the flip flop 84, and more specifically, the NAND gates R74 and R75, is controlled by the signals in the lead 76. The signals in the lead 76 indicate the point at which the output of the binary counter 72 is changed. That is, the signals in the lead 88 function so that when the information stored in the flip flop 85** is 1, the succeeding change of the condition of the input data signal is to 0 and when the stored information in said flip flop is 0, the succeeding change of the condition of the input data signal is to 1.

FIG. 9 shows the frame of an embodiment of the converting and multiplexing system of the present invention for hybrid multiplex transmission of an audio code pulse train and a data code pulse train. The hybrid multiplexing is accomplished by the unit of the equivalent audio channel slot. That is, in voice multiplex transmission by a 24-channel PCM system, eight bits are allotted to one sampling signal in each voice channel and seven bits of the eight bits are utilized for the transmission of the voice or audio signal information. The remaining one bit is utilized for the transmission of the ringing signal information. A frame of a repetition frequency of 8 kilocycles, or 125 microseconds, includes 24 channel slots. Each channel slot comprises eight bits and one bit of framing information necessary for receiving, decoding and channel demultiplexing. The framing information is added after the 24 slots. Thus, each of the 24 channel slots includes a total of 193 bits.

In the hybrid transmission system of the present invention for transmitting voices and data, transmission is by the insertion of two data changes, each comprising three or four bits in the idle channel slot, by the unit of a time slot of 8 bits allotted to each voice channel, as shown in FIG. 9. If 2N data channels are transmitted by a multiplex transmission system by the utilization of N idle voice channels, data may be transmitted at the maximum data speed of 8,000 bits per second. If a combination of a channel A and a channel A + 12 or a combination of a channel B and a channel B +6, B + 12 or B + 18 is utilized as the idle channel, the maximum data speed of 32,000 bits per second may be realized for the B channels. The maximum data speed may thus be increased greatly. Naturally, when all the channels are utilized, 512,000 bits per second may be transmitted in a three-bit conversion system in one channel. 256,000 bits per second may then be transmitted in each of two channels and 64,000 bits per second may be transmitted in each of eight channels. In a four-bit conversion system, when all the channels are utilized, 386,000 bits per second may be transmitted in one channel, 192,000 bits per second may be transmitted in each of two channels and 48,000 bits per second may be transmitted in each of eight channels.

As hereinbefore described, the conditions of the codes of input data or conditions of the input data signals are divided into equal time slots. Information which indicates the condition of the input data signal is encoded or coded in a time slot in which there is no change of the condition of the input data signal. Information including the instant or position of a change of condition of the input data signal is encoded in a time slot in which the condition of the input data signal changes. The codes are time division multiplexed with code pulse trains of other data signals for each of the equal time slots. That is, the codes are hybrid multiplexed in an idle channel slot in a code pulse train of a voice channel and are then transmitted. The system of the present invention thus provides digital transmission which is inexpensive, of high quality, and of high flexibility.

The system of the present invention as hereinbefore described is thus seen to include a converter and multiplexer for providing codes of informations indicating the condition of the input data signal and wherein 1 bit of $n$ bits is always utilized to indicate the condition of the input data signal and the combination of $n - 1$ bits is utilized to indicate the changes of condition, if any, of the input data signal. The converter and multiplexer of the system of the present invention converts the informations which indicate the condition and the changes of condition of the input data signals into $n$ bit codes. The $n$ bits are provided in successive time slots which are in turn subdivided into equal time intervals or subdivisions in converting asynchronous data signals into synchronous digital codes and multiplexing such codes, as hereinbefore described.

While the invention has been described by means of a specific example and in a specific embodiment, we do not wish to be limited thereto, for obvious modifications will occur to those skilled in the art without departing from the spirit and scope of the invention.

The operation of the various NAND gates of the flip flop 84 of FIG. **84*a*** will be explained in detail.

The flip flop 82 shows a state where there is no change in the condition of the signal in each of the sections into which asynchronous signals of two levels are divided. And, when asynchronous signals of two levels are in the condition of 1, the pulses appear at the line 83. When asynchronous signals of two levels are in the condition of 0, the pulses appear at the line connected to R 78. The flip flop circuit 80 produces the pulses at the time when there is a change in the condition of the signal in each of the sections into which asynchronous signals of two levels are divided. And when there is a change in the former half of such a section the pulse appears at the line 81. When there is a change in the latter half of such a section the pulse appears at the line connected to R 67.

The flip flop comprising R 74 and R 75 is controlled by the resultant pulses and the flip flop 85, and accordingly asynchronous signals being the transmitting informations are produced. The condition of R 74 is derived as the output 87.

D/D converter is short for Digital digital converter. D/D converter of the transmitting side in FIG. 3 is a circuit for converting the parallel pulses showing the state of asynchronous signals into the parallel synchronous codes. And D/D converter of the receiving side in FIG.

4 is a circuit for converting the parallel synchronous codes into the parallel pulses for producing asynchronous signals.

The logical circuits 25 and 16 mean the "Detecting Circuit." 25 is a circuit for detecting whether a change exists in the former half of the section or in the latter half of the section. 16 is a circuit for detecting a position of such change.

The logical circuit 38 is a D/D converter. The logical circuit 39 is a parallel Serial Converter. The logical circuit 61 is a circuit for synchronizing the signal with a timing of clock 3. The D/D converter comprises a combination of the logical circuits 61 and 65.

We claim:

1. A digital communications system for converting and transmitting asynchronous signals of two levels by synchronous digital transmission, comprising
   clock means for dividing asynchronous signals of two levels into equal time slots;
   detecting means for detecting the condition of said asynchronous signal at a determined instant in a time slot thereby also determining a change in condition of said signal;
   encoding means connected to said detecting means for indicating the condition of said signal in a specific code indication consisting of plural binary digits and depicting said condition and for indicating a change in condition of said signal in a different code indication consisting of plural binary digits and depicting the instant of change of condition in a time slot, said encoding means comprising converter means for converting the asynchronous signals in equal time slots into synchronizing pulses of $n$ bits;
   transmitting means connected to said encoding means for transmitting said code indications; and
   further clock means for subdividing the time slots into $2^n - 2$ subdivisions each, the code indication depicting the instant of change of condition being placed in said subdivisions.

2. In a pulse code modulation system for hybrid multiplex transmission of audio and data signals
   clock means for dividing asynchronous data signals of two levels into equal time slots;
   detecting means for detecting the condition of said asynchronous signal at a determined instant in a time slot thereby also determining a change in condition of said signal;
   encoding means connected to said detecting means for indicating the condition of said signal in a specific code indication consisting of plural binary digits and depicting said condition and for indicating a change in condition of said signal in a different code indication consisting of plural binary digits and depicting the instant of change of condition in a time slot, said encoding means comprising converter means for converting the asynchronous signals in equal time slots into synchronizing pulses of $n$ bits;
   multiplexing means connected to said encoding means for time division multiplexing said code indications;
   transmitting means connected to said multiplexing means for transmitting the time division multiplexed signals; and
   further clock means for subdividing the time slots into $2^n - 2$ subdivisions each, the code indication depicting the instant of change of condition being placed in said subdivisions.

3. A method of hybrid multiplex transmission of audio and data signals, comprising the steps of
   dividing asynchronous data signals of two levels into equal time slots;
   converting the asynchronous signals in equal time slots into synchronizing pulses of $n$ bits
   detecting the condition of the asynchronous signal at a determined instant in a time slot thereby also determining a change in condition of the signal;
   indicating the condition of the signal in a specific code indication consisting of plural binary digits and depicting the condition and indicating a change in condition of the signal in a different code indication consisting of plural binary digits and depicting the instant of change of condition in a time slot;
   subdividing the time slots into $2^n - 2$ subdivisions each and placing the code indication depicting the instant of change of condition in the subdivisions;
   time division multiplexing the code indications; and
   transmitting the time division multiplexed signals.

* * * * *